(No Model.)   2 Sheets—Sheet 1.
J. HARTER.
COMBINED HARROW, ROLLER, AND SCRAPER.
No. 277,029.   Patented May 8, 1883.
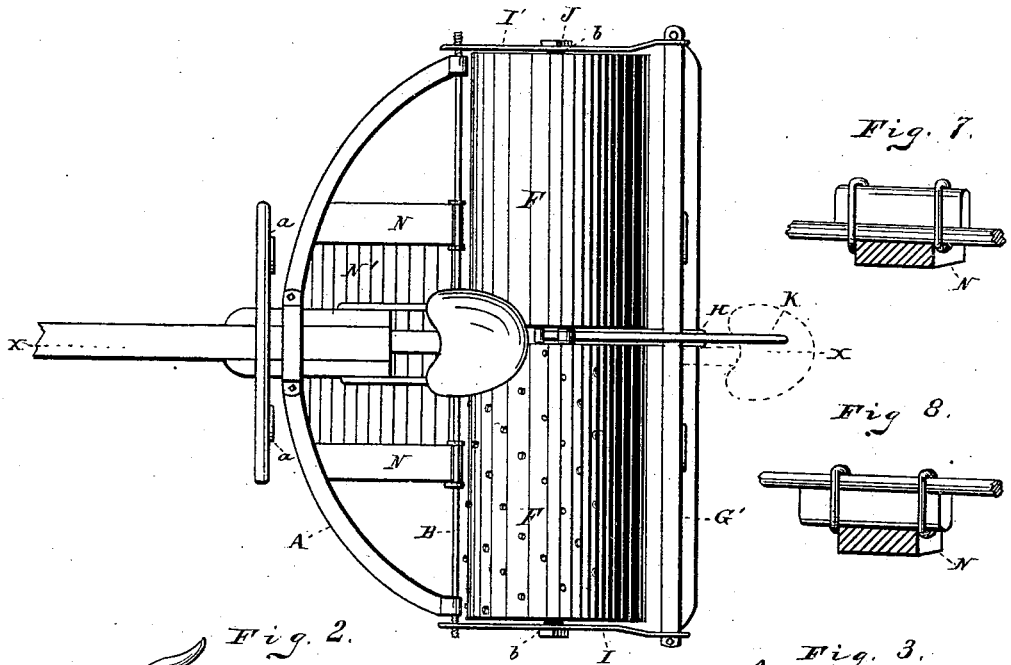
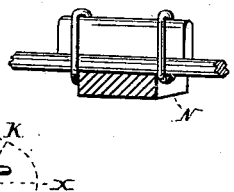
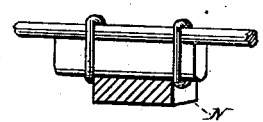
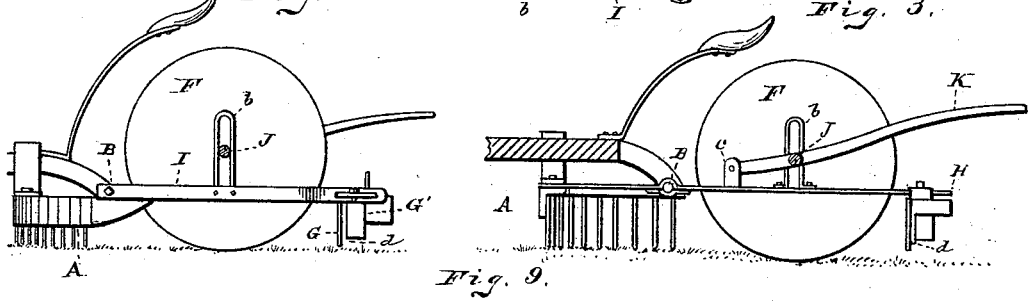
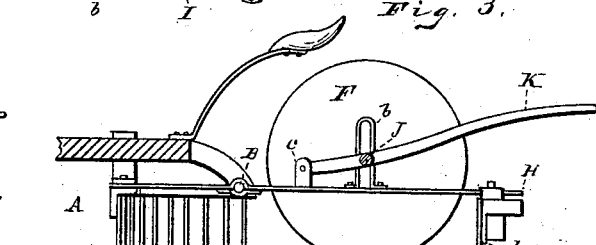
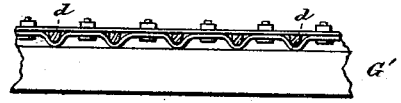
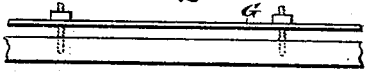
WITNESSES
Joseph Harter INVENTOR
By Leggett & Leggett ATTORNEYS (No Model.) 2 Sheets—Sheet 2.
J. HARTER.
COMBINED HARROW, ROLLER, AND SCRAPER.
No. 277,029. Patented May 8, 1883.
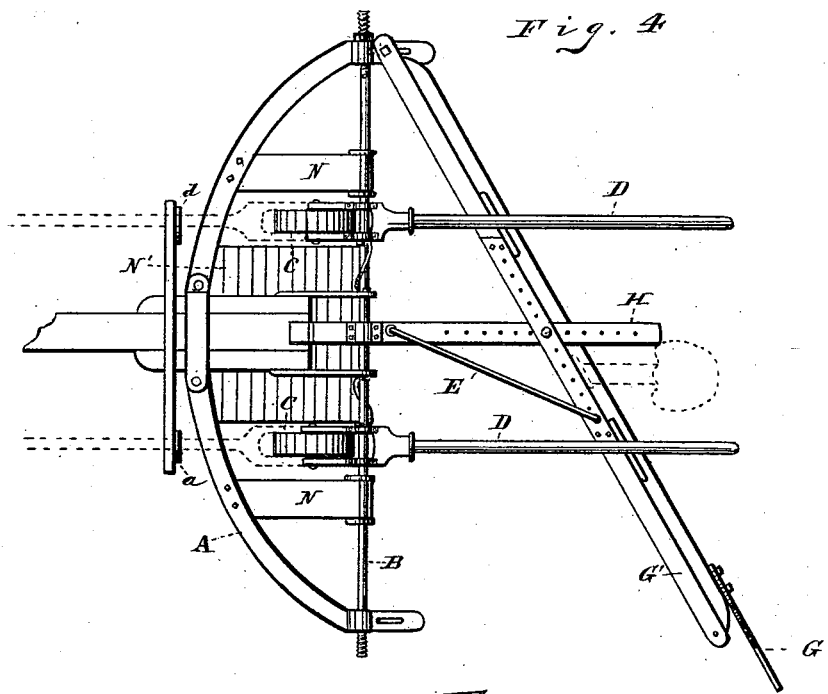
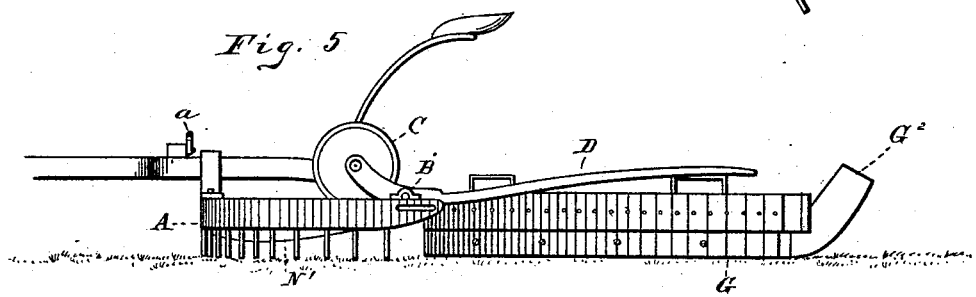
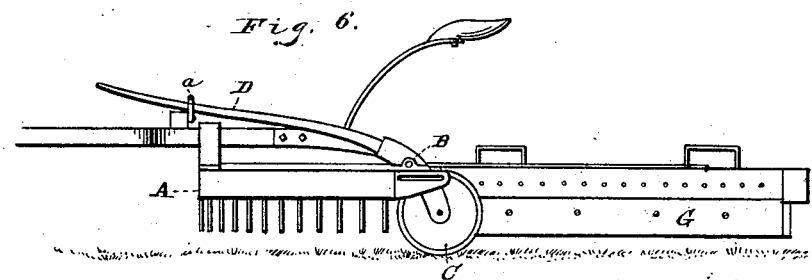
WITNESSES
W. Engel
S. G. Nottingham
Joseph Harter INVENTOR
By Leggett & Leggett ATTORNEYS

UNITED STATES PATENT OFFICE.

JOSEPH HARTER, OF TIFFIN, OHIO.

COMBINED HARROW, ROLLER, AND SCRAPER.

SPECIFICATION forming part of Letters Patent No. 277,029, dated May 8, 1883.

Application filed May 15, 1882. (No model.)

*To all whom it may concern:*

Be it known that I, JOSEPH HARTER, of Tiffin, in the county of Seneca and State of Ohio, have invented certain new and useful Improvements in a Combined Harrow, Roller, and Scraper; and I do hereby declare the following to be a full, clear, and exact description of the invention, such as will enable others skilled in the art to which it pertains to make and use the same.

My invention relates to a combined harrow, roller, and scraper, which may be used either conjointly or each may be used separately, as desired; and it consists in the peculiar construction of the machine or implement whereby it is adapted to be used as above mentioned, as will be hereinafter fully set forth and claimed.

In the drawings, Figure 1 is a plan view of my machine as used as a combined harrow, roller, and scraper. Fig. 2 is a side elevation of the same; and Fig. 3 is a vertical section taken through Fig. 1, line $x\ x$. Fig. 4 is a plan view of my machine with rollers detached and supporting-wheels substituted. Figs. 5 and 6 are side elevations of Fig. 4, showing the manner of operating the supporting-wheels and the function they perform. Figs. 7, 8, 9, 10, and 11 are detached views of some of the parts of my machine, showing more clearly their construction.

This invention is an improvement on a patent for road-scrapers granted to me December 14, 1880, and numbered 235,431.

Now, by reference to Figs. 1 and 2 of said patent, and to Fig. 4 of the drawings forming part of this present application, it will be seen that the constructions of the two machines are very similar, the difference being that I now provide a more simple device for raising or lowering the harrow from the ground—viz., two wheels, C C, are pivoted to the short arms of two levers, D D, which are in turn journaled on the bar B in such a manner that as the long arms of the levers D D are thrown back or forward they will act to raise or lower the harrow-frame, as shown in Figs. 5 and 6. Suitable means are provided for securing said levers in the forward position, one means being shown which consists of two hooks, *a a*, with which the levers engage, as shown in Fig. 6. A brace, E, is secured at one end to the reach H and at its opposite end to the outer and unsupported end of the scraper, thereby stiffening the latter and preventing it from springing. The reach H is also made to extend back to a considerable distance farther, so as to permit of the scraper G being set back far enough to admit of the use of rollers F F.

When it is so desired to use the rollers F F it is only necessary to remove the levers D D with their wheels C C, which is done by removing the nut from one end of the bar B and drawing it (the bar) out. The bar B is again replaced, the wheels C C and levers D D being removed, as shown in Fig. 1. Two side bars, I I', are now secured, one to each end of the bar B, by means of nuts. (Not shown.) Extending upward from the side bars, I I', and also from the reach H are vertical guides, *b b b*, through which the shaft J of the rolls F F passes.

Between the rolls F F is a lever, K, which is pivotally attached to a lug, *e*, extending upward from the reach H, and is also journaled on the shaft J in such a manner that when the long arm of the lever K is depressed it will act to raise the harrow A and scraper G from the ground, when the roller may be operated alone.

Secured in the rear of the rollers F F to the ends of the side bars, I I', is the scraper G, which differs essentially from the scraper shown and described in my former patent.

As now made my scraper-bar G is provided with teeth, *d*, which are preferably secured to said bar in the manner shown in Fig. 9, which will be readily understood from said figure. I also provide a curved piece, $G^2$, which is detachably attached to the outer end of the scraper, and is used for the purpose of cleaning or scraping gutters.

Fig. 10 shows the manner of securing the scraper G to the bar G'—viz, by passing the same over the teeth *d* and bolting the scraper thereon. Fig. 11 shows my preferred manner of forming my harrow-teeth.

When the scraper G is detached from the teeth *d* on the bar G' the said bar G' and teeth *d* may be used as a rake or harrow.

N N are gage-bars, which are pivotally secured to the harrow A, and adjustably secured by the blocks and links, as shown in Figs. 7 and 8, to the bar B so as to enter above or below the bar and adapt them to be raised or lowered to gage the depth to which the teeth of the harrow A shall enter the ground. If desired, a platform, N', may extend between the said gage-pieces, as shown in Figs. 1 and 4.

The rolls F F may, if desired, be provided with teeth, as shown in the drawings, Fig. 1.

The parts of my device not herein mentioned or fully set forth are described in my aforesaid patent, and hence I do not deem it necessary to further describe them in this my present application.

What I claim is—

1. The combination, with a scraper and harrow, of the transverse shaft B, levers D D, pivoted thereto, the short ends of said levers having wheels C C journaled therein, substantially as set forth.

2. The combination, with a harrow and scraper, of the reach H and the brace E, the latter connecting the reach and scraper, substantially as set forth.

3. The combination, with a harrow and scraper combined as herein described, of the rollers F F, substantially as shown and described.

In testimony whereof I have signed my name to this specification in the presence of two subscribing witnesses.

JOSEPH HARTER.

Witnesses:
W. E. DONNELLY,
JNO. CROWELL, Jr.